June 8, 1926.
W. L. BESSOLO
1,587,892
SAFETY TIE FOR TONGS
Filed Dec. 21, 1922
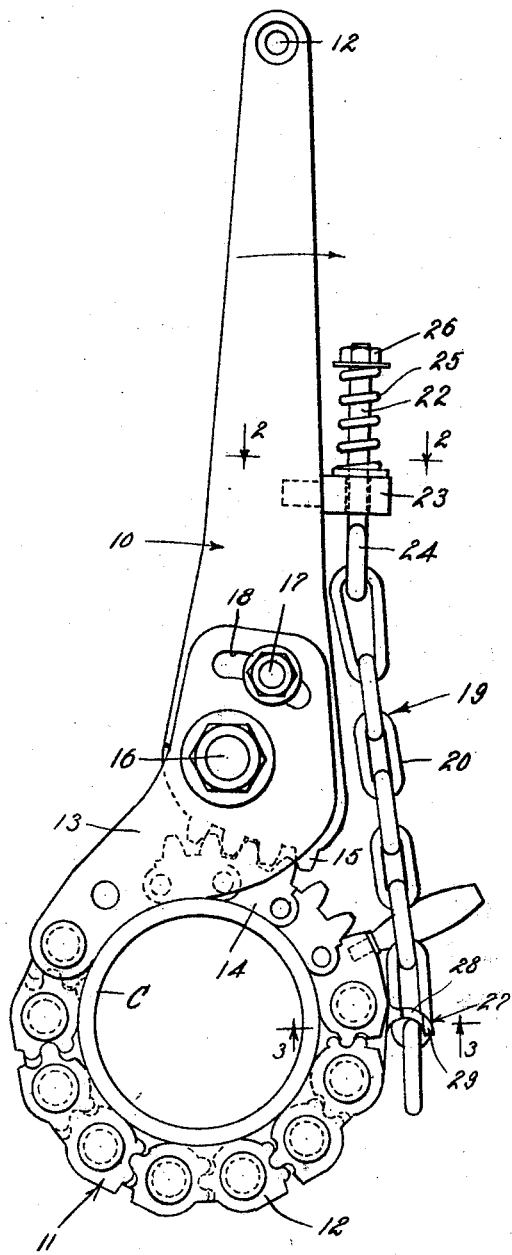
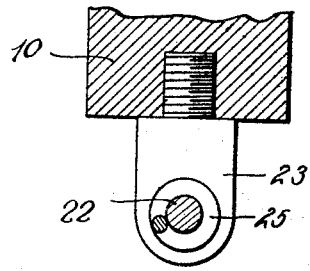
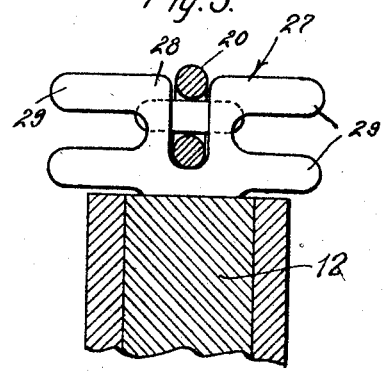
Inventor
William L. Bessolo
by W. W. Maxwell
his Attorney Patented June 8, 1926.

1,587,892

UNITED STATES PATENT OFFICE.

WILLIAM L. BESSOLO, OF CLEARWATER, CALIFORNIA.

SAFETY TIE FOR TONGS.

Application filed December 21, 1922. Serial No. 608,200.

This invention has to do with a safety tie for tongs, and it is an object of my invention to provide a simple, effective, releasable means of this character.

The present invention is applicable to tongs or the like of various constructions, and it is particularly applicable to that general type of tongs known as chain tongs. For the purpose of facilitating a full and clear understanding of my invention I will herein describe it as applied to the type of tongs set forth and claimed in my Patent No. 1,447,920, granted March 6, 1923, for pipe tongs; and my copending application Serial No. 592,365, filed October 4, 1922, entitled Tongs.

It is an object of my invention to provide a safety tie for tongs which is easily and quickly manipulated, and which is secure and reliable. Another object of my invention is to provide an effective, reliable safety tie which is extremely simple and inexpensive of construction. Another object of my invention is to provide a safety tie for tongs which is simple, and which can be easily and quickly set to secure the tongs when the tongs is arranged in various different positions.

The various objects and features of my invention will be best and more fully understood from the following detailed description of a typical preferred form and embodiment of my invention, throughout which reference is had to the accompanying drawings, in which—

Fig. 1 is a view showing a casing tong of the chain type provided with the safety tie of the present invention;

Fig. 2 is an enlarged detail sectional view taken as indicated by line 2—2 on Fig. 1; and Fig. 3 is an enlarged detail sectional view taken as indicated by line 3—3 on Fig. 1.

The tongs which I have illustrated in the drawings includes, generally, two main parts, a lever or handle part 10, and a releasable casing-engaging mechanism 11. In the tongs which I have illustrated, the handle 10 is of the more or less usual design and construction, being a unitary member somewhat convergently tapered from its inner end to its outer end and formed at its outer end with an eye 12 to receive an operating line, or the like. The casing-engaging mechanism 11 embodies a chain 12 having one end secured to the inner end of the handle 10 by suitable connecting plates 13. The other or outer end of the chain 12 carries a rack 14 adapted to cooperate with a rack 15 on the inner end of the handle 10 to releasably connect the outer end of the chain with the handle so that the chain will tighten on and grip the casing C, upon the handle being swung in the direction indicated by the arrow in Fig. 1. The rack 15 on the inner end of the handle 10 is eccentric to the axis of the connection of the plates 13 with the handle so that it closes in toward the casing C and draws the chain 12 tightly on the casing when the handle is operated in the direction indicated by the arrow. The plates 13 are pivotally connected with the handle 10 by a suitable bolt 16, and their pivotal movement relative to the handle 10 to allow the racks 14 and 15 to be moved into and out of cooperative engagement, is limited by a bolt 17 arranged through the handle 10 and through suitable arcuate slots 18 formed in the plates 13. When the handle 10 is swung in the direction opposite to that indicated by the arrow in Fig. 1, the rack 15 is in position where it allows the rack 14 to be moved between it and the casing, so that the rack 14 can be moved into or out of position between the rack 15 and casing. The particular tongs herein so far described is more fully described both as to construction and operation in my above-identified patent and application, in which it is claimed.

The present invention provides a tie device 19 for tying the casing-engaging mechanism 11 in the closed position around a casing C to normally hold the tongs in position on the casing, and to prevent disengagement of the casing-engaging mechanism 11 from the casing upon accidental movement of the handle 10 to a position to allow the rack 14 to become disengaged from the rack 15. The tie device 19 provided by my invention includes resilient means and is preferably located and arranged in connection with the parts of the tongs so that it resiliently holds the tongs in gripping position on the casing. The tie device, in accordance with my invention, is adapted to connect the two main parts of the tongs, and is preferably arranged to connect the handle part 10 with the outer end portion of the chain 12 of the casing-engaging mechanism 11. Further, in accordance with my invention, I prefer to permanently secure the tie device to one of the main parts of the tongs and to provide means for releasably connecting it with the other of the main parts of the tongs.

In the preferred form of construction illustrated in the drawings, the tie device 19 includes a chain 20 having one end secured to the handle 10 and the other end adapted to releasably attach to the outer end of the chain 12. The chain 20 is connected with the handle 10 by means of a rod 22 carried by a lug 23 provided on the handle 10. In accordance with my invention the rod 22 is slidably carried by the lug 23, and has an eye 24 at the inner side of the lug to receive the chain 20 and carries a spring 25 at the outer side of the lug. The spring 25 is a helical compression spring, carried on the rod 22, between the lug 23 and a nut 26 screw-threaded on the end of the rod 22.

As a preferred means of releasably connecting the chain 20 with the outer end portion of the chain 12, I have illustrated a hook device 27 mounted on the outer side of the chain 12 to receive and grip the chain 20. The hook device provided by the present invention includes a pair of hook-shaped prongs 28 which extend outwardly from the chain 12 and two pairs of hook-shaped prongs 29 extending in opposite directions from the outer sides of the prongs 28. When the tongs is in horizontal position the prongs 28 extend horizontally, one pair of prongs 29 extends upwardly, and the other pair of prongs 29 extends downwardly. It will be noted from inspection of the drawings, that the prongs of the hook device are suitably curved or hooked. The prongs of the hook device are spaced and proportioned so that they will receive and grip the links of the chain 12 in the manner clearly illustrated in the drawings.

It will be obvious, of course, that various other means may be provided for releasably connecting the chain 20 with the chain 12, and that the design and proportioning of the hook device 27 may be varied to accommodate any particular type of chain 20 that may be employed. The particular hook device 29 which I have illustrated, is intended particularly to receive and cooperate with an ordinary link chain, such as I have illustrated in the drawings.

In operating the tongs equipped with the tie device provided by the present invention, the handle and casing-engaging mechanism 11 are suitably manipulated to apply the casing-engaging mechanism to the casing so that it will grip the casing upon actuation of the handle. The chain 20 is then gripped and pulled toward the chain 12 until the spring 25 is somewhat compressed. The outer end portion of the chain 20 is then connected with the outer end portion of the chain 12 by arranging it in connection with one of the pairs of prongs of the hook device 27. In practice the chain 20 is arranged in connection with a pair of prongs facing upwardly or horizontally, so that it will not have a tendency to drop out of engagement with the hook device. The tie device is then set so that it secures the casing-engaging mechanism in closed position on the casing C, and so that its resilient means, in the present case the spring 25, tends to hold the tongs in position so that it grips the casing and is immediately ready for operation. During operation of the tongs the spring 25 holds the chain 20 tight between the handle 10 and chain 12 so that the chain 20 does not become displaced from the hook device 27, and the chain 20 is always in condition so that it securely and effectively ties the casing-engaging mechanism closed and prevents it from becoming displaced from the casing regardless of how the tool may be operated or manipulated. When it is desired to release the tongs from the casing the chain 20 is released from the hook device 27 by pulling it slightly to compress the spring 25 to gain enough looseness to disengage it from the hook device, and thereafter manipulating the tongs to disengage the racks 14 and 15.

Having described only a typical preferred form of my invention, I do not wish to limit myself to the specific details hereinabove set forth, but wish to reserve to myself any changes or variations that may appear to those skilled in the art or fall within the scope of the following claims.

Having described only a preferred form of my invention, I claim:

1. A tool of the character described including two parts, one a lever, the other a casing-engaging mechanism adapted to close around a casing, a tie having one end slidably connected with one part and the other end adapted to detachably connect with the other part, and resilient means at the slidable connection to hold the detachable connection tight.

2. A tool of the character described including two parts, one a lever, the other a casing-engaging mechanism adapted to close around a casing, one of the parts having an opening in it, a tie having one end extending slidably through the opening, hook means for detachably connecting the other end of the tie with the other part, and a spring arranged between the first-mentioned part and the first-mentioned end of the tie.

3. A tool of the character described including a lever, a casing-engaging mechanism connected with the lever and adapted to close around a casing, a projection on the lever, a tie having one end slidably carried by the projection and projecting from the projection, a compression spring arranged between the projection and the outer part of said end of the tie, and hook means for releasably connecting the other end of the tie with the casing-engaging mechanism to hold it closed.

4. A tool of the character described including a lever, a casing-engaging mechanism carried by the lever and adapted to close around a casing, a projection on the lever, a tie including a chain and a rod on one end of the chain and slidably carried by the projection so that its outer end projects from the projection, a spring arranged between the projection and the outer end of the rod, and hook means on the casing-engaging mechanism adapted to releasably connect the chain with the casing-engaging mechanism.

In witness that I claim the foregoing I have hereunto subscribed my name this 2nd day of Dec. 1922.

WILLIAM L. BESSOLO.